(12) United States Patent
Kim (10) Patent No.: US 7,852,618 B2
(45) Date of Patent: Dec. 14, 2010

(54) FUNCTION EXTENDING ASSEMBLY AND PORTABLE TERMINAL HAVING THE SAME

(75) Inventor: Chi-Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 12/354,573

(22) Filed: Jan. 15, 2009

(65) Prior Publication Data
US 2010/0002377 A1    Jan. 7, 2010

(30) Foreign Application Priority Data
Jul. 1, 2008    (KR) ...................... 10-2008-0063613

(51) Int. Cl.
*G06F 1/16* (2006.01)
(52) U.S. Cl. .................. 361/679.01; 455/566; 345/175; 710/310; 439/676
(58) Field of Classification Search .............. 455/550.1, 455/566, 575.1, 88; 345/163, 173, 175, 211; 439/79, 374, 676; 320/101, 107; 710/300, 710/301, 305, 310; 361/679.01, 679.02, 361/679.08, 670.21, 679.22, 679.33, 679.48, 361/679.49
See application file for complete search history.

(56) References Cited

U.S. PATENT DOCUMENTS

| | | | |
|---|---|---|---|
| 2007/0026907 A1* | 2/2007 | Jeun ........................ | 455/575.1 |
| 2007/0129100 A1* | 6/2007 | Kim ........................ | 455/550.1 |
| 2009/0163247 A1* | 6/2009 | Song ........................ | 455/566 |
| 2010/0073854 A1* | 3/2010 | Jeong et al. ............ | 361/679.01 |

* cited by examiner

*Primary Examiner*—Hung V Duong
(74) *Attorney, Agent, or Firm*—Birch, Stewart, Kolasch & Birch, LLP (57) ABSTRACT

A function-extending assembly and a portable terminal having the same. The function-extending assembly includes a body to which a terminal body is detachably mounted, and having a module mounting unit; function-extending modules detachably mounted to the module mounting unit, and providing one or more functions relating to the terminal body; and a user input unit disposed on the module mounting unit, and receiving a user input information as manipulating units installed at the function-extending modules are handled. Since a plurality of function-extending modules having various functions are applied to the function-extending assembly in a replaceable manner, various extended functions are provided to the portable terminal serving as a single device.

20 Claims, 11 Drawing Sheets

FUNCTION EXTENDING ASSEMBLY AND PORTABLE TERMINAL HAVING THE SAME

RELATED APPLICATION

The present disclosure relates to subject matter contained in priority Korean Application No. 10-2008-0063613, filed on Jul. 1, 2008, which is herein expressly incorporated by reference in its entirety.

BACKGROUND OF THE INVENTION

1. Field of the Invention

The present invention relates to a function-extending assembly to which a terminal body and function-extending modules are detachably mounted, and a portable terminal having the same.

2. Background of the Invention

In general, a portable terminal serves as a portable device providing one or more functions such as enabling voice and video calls, information input/output, and data storage.

As the portable terminal now provides many additional services in addition to the basic call service, a user can capture photos or moving images, reproduce music or moving image files, play games, receive broadcasting programs, and so on. The portable terminal is implemented as a multimedia player.

In order to implement complicated functions of the multimedia player, various advances are being made in hardware and software. For instance, a user interface to allow a user to easily and conveniently search or select functions is provided.

However, considering the portable nature of the portable terminal, it is difficult to mount devices such as the user interface that provides input/output functions to the portable terminal. Accordingly, a user's demands for the portable terminal are not satisfied.

Furthermore, since the portable terminal is currently regarded as a person's belongings to express his or her personality, various designs of the portable terminal are required.

SUMMARY OF THE INVENTION

Therefore, a first object of the present invention is to provide a function-extending assembly capable of providing various functions to a portable terminal, or extending the existing functions, and a portable terminal having the same.

A second object of the present invention is to provide a function-extending assembly capable of providing various extended functions to a portable terminal serving as a single device, by providing a plurality of function-extending modules having various functions and replaceable by each another, and a portable terminal having the same.

A third object of the present invention is to provide a function-extending assembly capable of simplifying a structure of function-extending modules by implementing a user input unit.

To achieve these and other advantages and in accordance with the purpose of the present invention, as embodied and broadly described herein, there is provided a portable terminal, comprising: a terminal body having a wireless communication function; and a function-extending assembly to which the terminal body is detachably mounted, wherein the function-extending assembly comprises a body having a module mounting unit; function-extending modules detachably mounted to the module mounting unit, and providing one or more functions relating to the terminal body; and a user input unit disposed on the module mounting unit, and receiving a user input information as manipulating units installed at the function-extending modules are handled.

The body may include a first cover having a body mounting unit to mount the terminal body; and a second cover connected to the first cover so as to be foldable with respect to the first cover, and provided with the module mounting unit.

The function-extending modules may include at least one of qwerty-type key pads, key pads for games, key pads for music reproduction, speaker modules, and display modules.

A circuitry supporting substrate, such as a printed circuit board (PCB) that is provided with electronic components relating to the function-extending modules, is mounted to the module mounting unit. A user input unit may be formed on the PCB.

The manipulating units may include one or more key buttons that receive an input in a pressing manner The user input unit may include dome switches installed on the PCB.

Sensing protrusions may be provided for pushing one or more of the dome switches so that the body can sense whether one of the function-extending modules has been mounted or not.

A plurality of the function-extending modules are formed so as to have different functions, and which may be used in a replaceable manner. The sensing protrusions are formed at different positions, or in different numbers according to each of the function-extending modules.

The user input unit may be arranged at a plurality of positions so that the function-extending modules can be applied thereto.

The manipulating units may be formed at different positions according to each of the function-extending modules, and may be formed at positions corresponding to one or more of the user input units.

One or more of the user input units may be configured so as to be selectively activated according to positions of the manipulating units arranged at the function-extending modules.

The terminal body may be configured so that the function-extending modules can be activated when one of the function-extending modules is mounted thereto.

To achieve these and other advantages and in accordance with the purpose of the present invention, as embodied and broadly described herein, there is also provided a function-extending assembly, comprising: a body to which a terminal body is detachably mounted, and having a module mounting unit; function-extending modules detachably mounted to the module mounting unit, and providing one or more functions relating to the terminal body; and a user input unit disposed on the module mounting unit, and receiving a user input information as manipulating units installed at the function-extending modules are handled.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a portable terminal according to the present invention will be explained in more detail.

Figure 1:
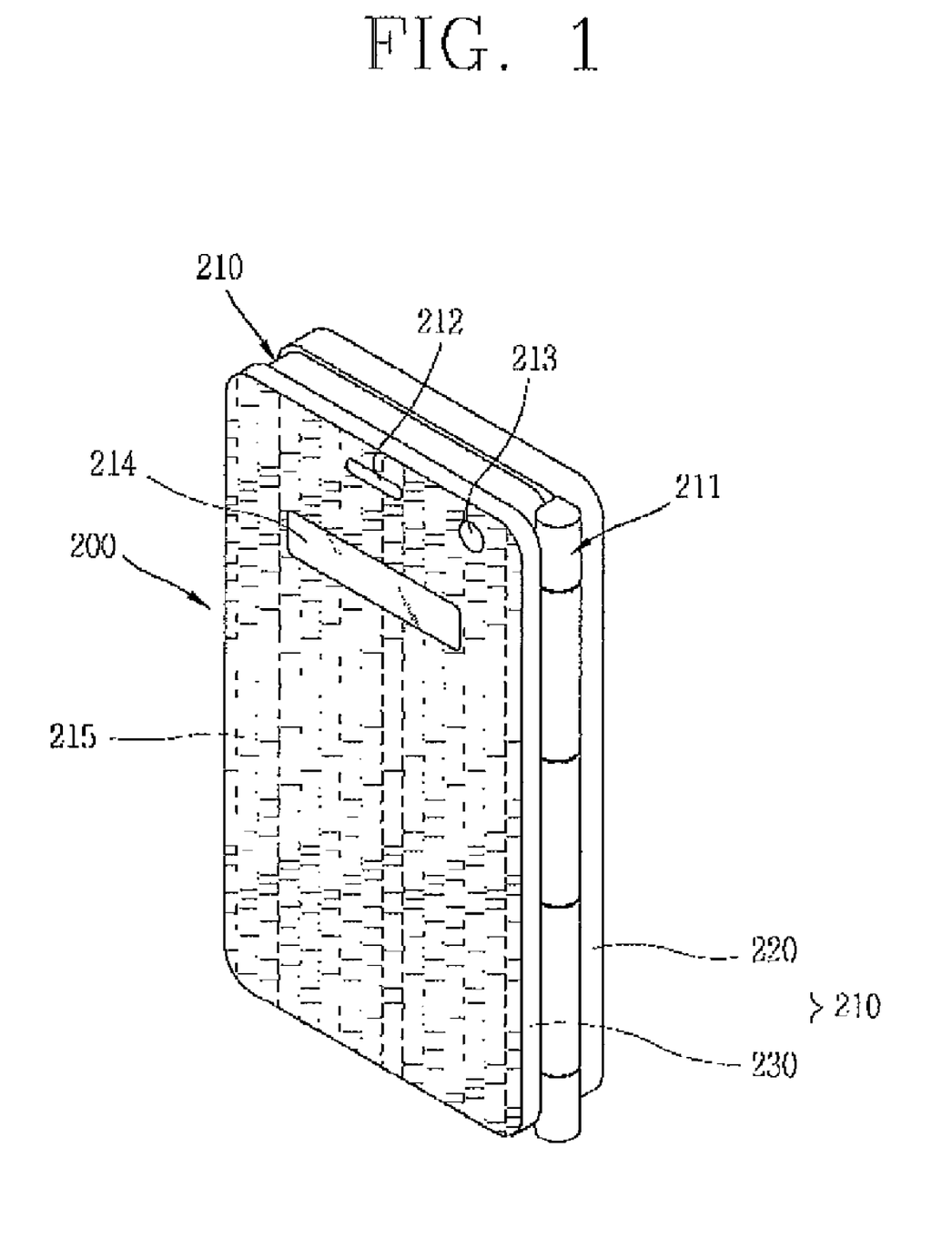
FIGS. 1 and 2 are front perspective views showing a portable terminal according to a first embodiment of the present invention.
Figure 2:
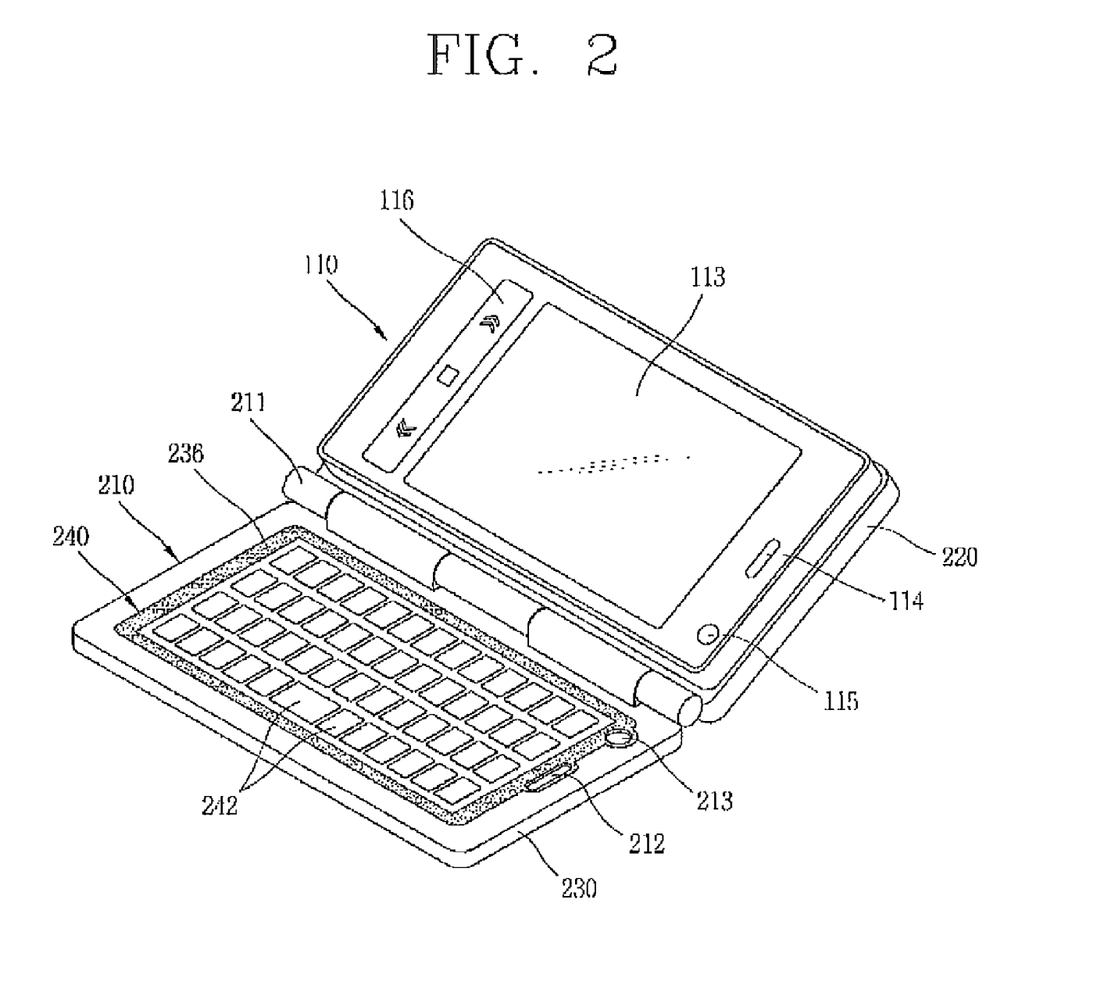

FIGS. 1 and 2 are front perspective views showing a portable terminal according to a first embodiment of the present invention.

The portable terminal according to the present invention comprises a terminal body 110 having a wireless communication function, and a function-extending assembly 200 to which the terminal body 110 is detachably mounted.

The function-extending assembly 200 is provided with a body 210 that constitutes an appearance, and a function-extending module 240 is detachably mounted to the body 210.

The body 210 may include a first cover 220 and a second cover 230 connected to each other so as to be foldable with respect to each other. The first and second covers 220 and 230 may be rotatably connected to each other by a hinge connection unit 211. In the present invention, the body 210 is implemented as a folder type. However, the body 210 may be implemented in a structure having two or more covers that are coupled to each other so as to be relatively movable, and one or more regions of the terminal body 110 are covered by the two or more covers.

As shown in FIG. 1, a configuration where the second cover 230 is disposed to overlap the terminal body 110 is referred to as a 'closed configuration', and a configuration where the second cover 230 exposes one or more parts of the terminal body 110 is referred to as an 'open configuration'.

The terminal body 110 is detachably mounted to the first cover 220, and the function-extending module 240 is detachably mounted to the second cover 230.

A protection layer 215 formed of a leather material may be mounted to the first and second covers 220 and 230. The protection layer 215 serves not only to enhance an appearance of the body 210, but also to protect the terminal body 110 from external impacts such as falling.

Figure 3:
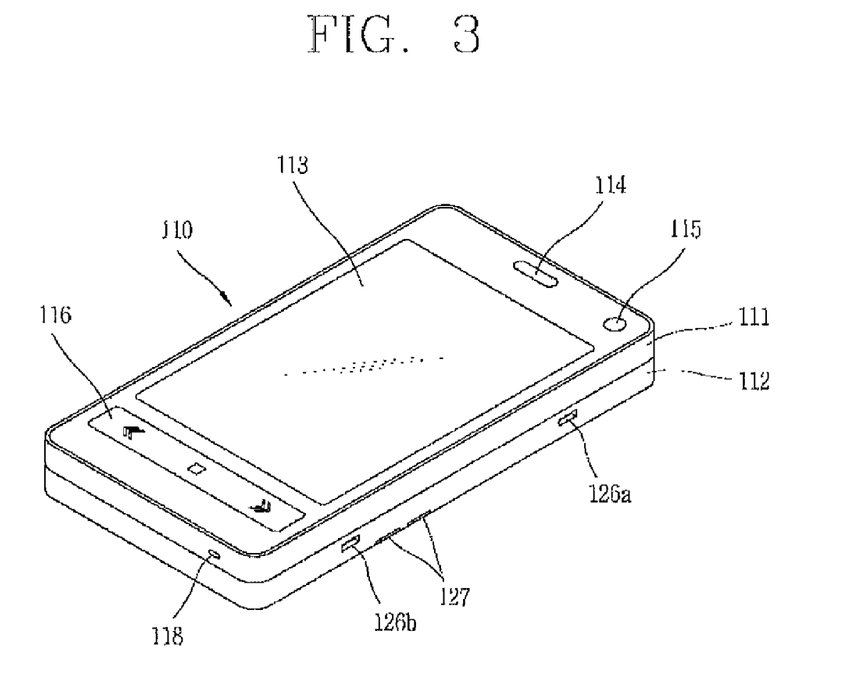
FIGS. 3 and 4 are front and rear perspective views, respectively, showing the terminal body of FIG. 2.
Figure 4:
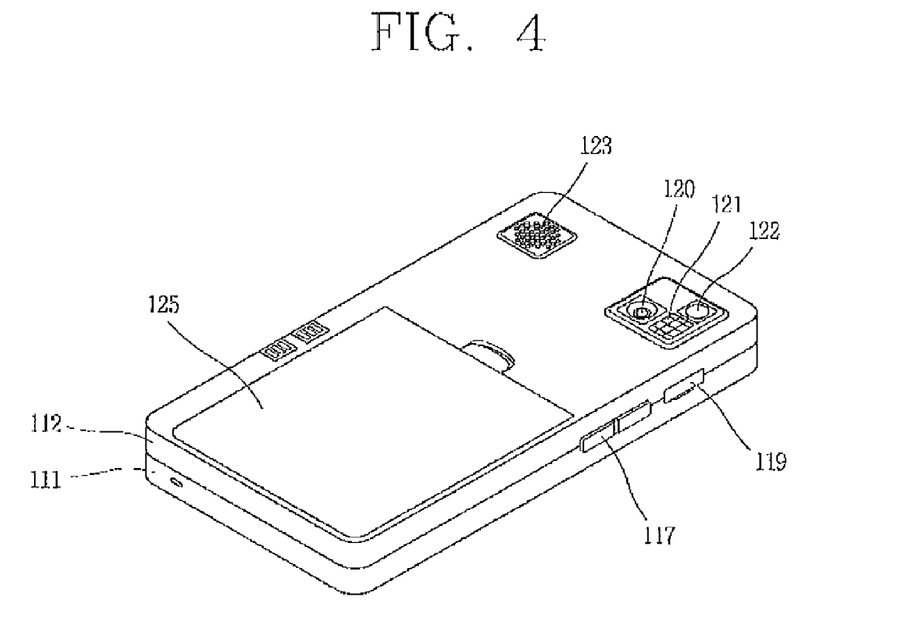

FIGS. 3 and 4 are front and rear perspective views, respectively, showing the terminal body of FIG. 2.

In the present invention, the terminal body 110 is implemented as a bar type. However, the terminal body 110 is not limited to the bar type, but may be implemented in a variety of different configurations. Examples of such configurations include a folder-type, slide-type, bar-type, swing-type, and so forth.

The terminal body 110 includes a case (casing, housing, cover, and the like) that forms an external appearance. The case may be divided into a front case 111 and a rear case 112. Various electronic components are mounted in a space formed by the front case 111 and the rear case 112. One or more intermediate cases may be provided between the front case 111 and the rear case 112.

The front and rear cases 111,112 may be formed by injection-molding synthetic resin, or formed using metallic material such as stainless steel (STS) and titanium (Ti).

On the terminal body 110 may be disposed a display 113, a first audio output unit 114, a first video input unit 115, first and second manipulating units 116 and 117, an audio input unit 118, an interface 119, and so forth.

The display 113 for visually displaying information may include at least one of a Liquid Crystal Display (LCD), an Organic Light Emitting Diodes (OLED) display, a thin film transistor (TFT)-LCD display, and a flexible display.

The display 113 for visually displaying information may be implemented in a touch manner. Accordingly, the display 113 may be referred to as a 'touch screen'. The display 113 may be further provided with a touch sensor such as at least one of a touch film, a touch sheet, and a touch pad.

The first audio output unit 114 may be implemented as a receiver or a speaker.

The first video input unit 115 may be implemented as a camera module for capturing a user's images or moving images.

The first and second manipulating units 116 and 117 receive commands for controlling an operation of the portable terminal. The first and second manipulating units 116 and 117 may be implemented by a user in a tactile manner.

For instance, the first and second manipulating units 116 and 117 may be implemented as dome switches or touch pads that can receive commands or information by a user's push or in a touch manner, or may be implemented as jog wheels and/or jog switches.

The first or second manipulating units 116 or 117 may input various commands. For instance, the first manipulating unit 116 may serve to input various commands such as start, stop, and scroll commands, and the second manipulating unit 117 may serve to input commands to control a volume level of sound output from the first audio output unit 114, or to convert a current mode of the display 113 into a touch recognizing mode, and so forth.

The audio input unit 118 for receiving a user's voice, other sounds, and so forth, may be implemented as a microphone.

The interface unit 119 provides as a passage through which the portable terminal of the present invention may exchange data with external devices. The interface unit 119 may be implemented by wire or by radio, and may include one of an access port to an earphone, a short-range communication port (e.g., IrDA port), a wireless LAN port, and a power supply port for supplying power to the portable terminal.

The interface unit 119 may be a card socket for receiving an external card such as a subscriber identification module (SIM), a User Identification Module (UIM), and a memory card for storing information.

A second video input unit 120 may be additionally mounted to a rear surface of the terminal body 110. The second video input unit 120 faces a direction opposite to that faced by the first video input unit 115 (refer to FIG. 3). The second video input unit 120 may be a camera having capabilities different from those of the first video input unit 115.

The first video input unit 115 may operated with a relatively lower resolution so that a user's face captured during a video conference can be directly transmitted to another party. On the contrary, the second video input unit 120 may operate with a relatively higher resolution since a captured image is not directly transmitted to another party. The first or second video input units 115 or 120 may be implemented so as to be rotatable or popped-up.

A flash 121 and a mirror 122 are additionally arranged near the second video input unit 120. The flash 121 provides light to a subject to be captured by the second video input unit 120. The mirror 122 is useful for assisting a user to position the second video input unit 122 in a self-portrait mode.

A second audio output unit 123 may be additionally arranged on a rear surface of the terminal body 110. The second audio output unit 123 may cooperate with the first audio output unit 114 (refer to FIG. 3) to provide stereo output. Also, the second audio output unit 123 may be configured to operate as a speakerphone.

A broadcast signal receiving antenna may be disposed at one side of the terminal body 110, in addition to an antenna for communications. The antenna may be configured to retract into the terminal body 110.

A power supply 125 for supplying power to the portable terminal 100 is mounted to the terminal body 110. The power supply 125 is implemented as a chargeable battery, and may be detachably mounted to the outside of the terminal body 110. The power supply 125 may be implemented as a battery mounted in the terminal body 110.

Figure 5:
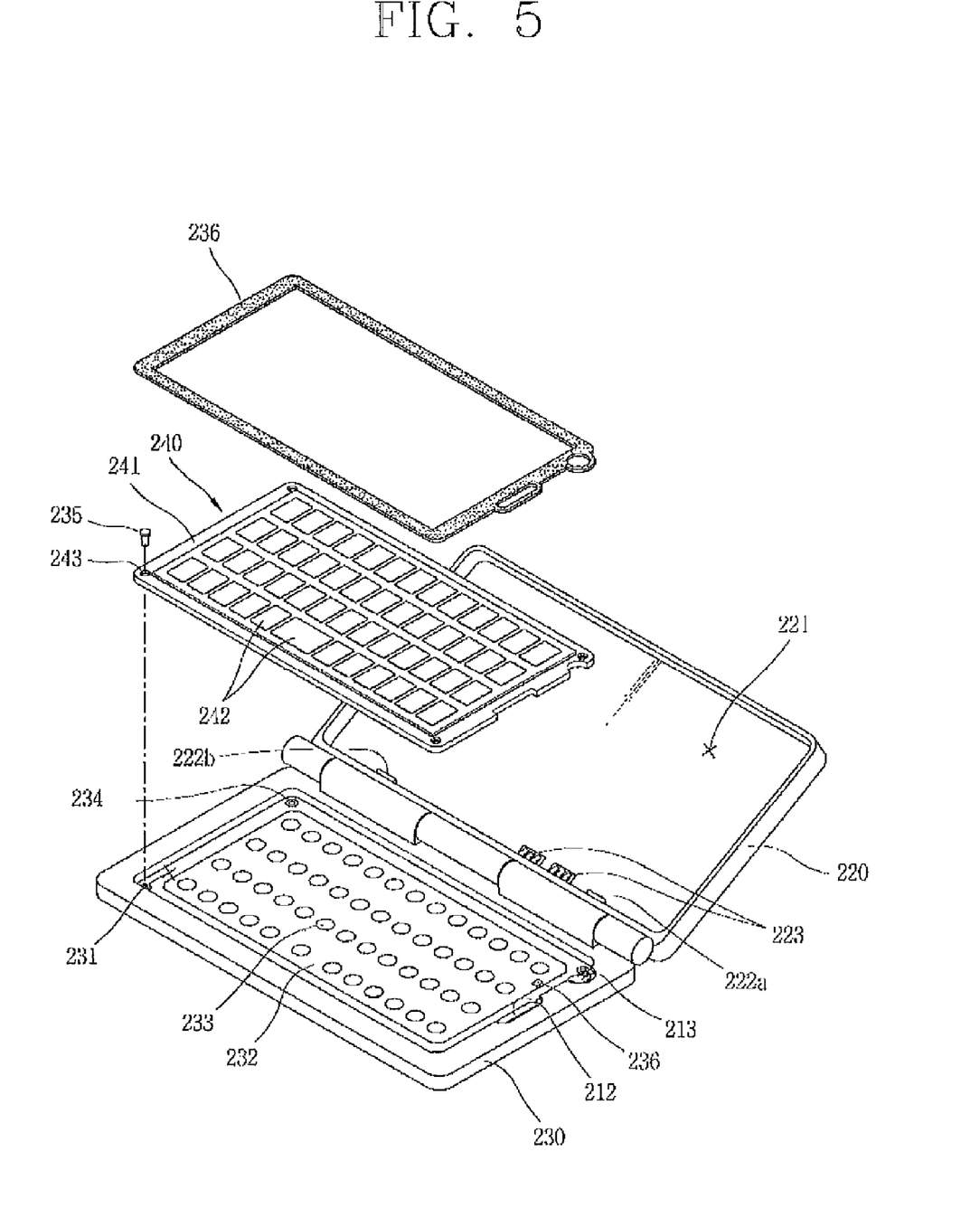
FIG. 5 is an exploded perspective view showing a function-extending assembly of FIGS. 1 and 2.
Figure 6:
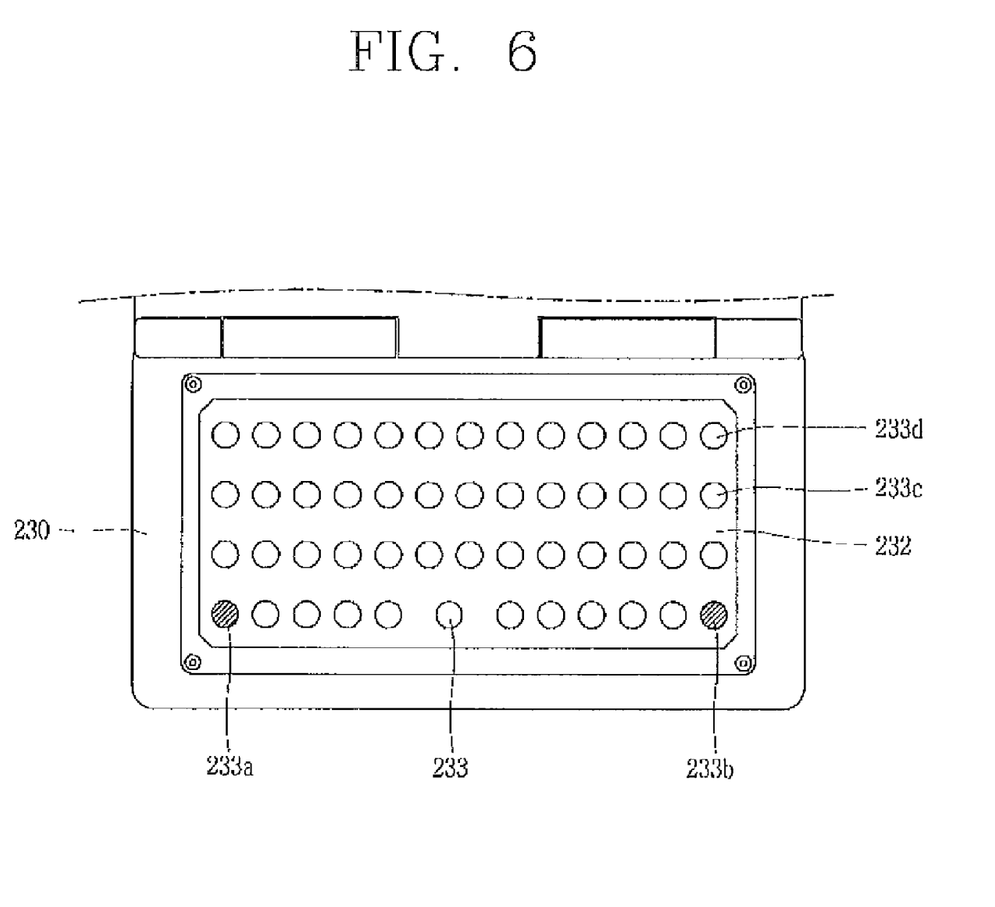
FIG. 6 is a plan view showing a second cover of FIG. 5.

FIG. 5 is an exploded perspective view showing the function-extending assembly of FIGS. 1 and 2, and FIG. 6 is a plan view showing the second cover of FIG. 5.

A body mounting unit 221 for detachably mounting the terminal body 110 is formed at the first cover 220. The body mounting unit 221 may be formed to have a shape corresponding to an appearance of the terminal body 110.

A locking unit for locking or unlocking the terminal body 110 to/from the first cover 220 is disposed between the terminal body 110 and the first cover 220. The locking unit includes locking grooves 126a and 126b formed at the terminal body 110, and locking protrusions 222a and 222b formed at the body mounting unit 221.

The terminal body 110 is locked to the body mounting unit 221 as the locking protrusions 222a and 222b are locked to the locking grooves 126a and 126b, respectively. Under this state, once the terminal body 110 is pulled from the body mounting unit 221 in a separating direction, the locking protrusions 222a and 222b are elastically deformed to be unlocked from the locking grooves 126a and 126b. Accordingly, the terminal body 110 is separated from the first cover 220.

In the present invention, the locking units are implemented as the aforementioned locking protrusions and locking grooves. However, the locking units may be also implemented as any pair of components that can be engaged to each other.

An extension interface for electrically connecting the terminal body 110 and the function-extending assembly 200 to each other is provided between the terminal body 110 and the first cover 220. The extension interface may include a first extension interface 127 installed at the terminal body 110, and a second extension interface 223 installed at the body mounting unit 221.

The first extension interface 127 may be implemented as a connection terminal, and the second extension interface 223 may be implemented as a connection pin. As the first and second extension interfaces 127 and 223 come in contact with each other when the terminal body 110 is mounted to the body mounting unit 221, the terminal body 110 is electrically connected to the body 210. The terminal body 110 supplies power to the function-extending module 240, or performs data transmission/reception, through the first and second extension interfaces 127 and 223.

The second extension interface 223 may be electrically connected to a circuitry supporting substrate, such as a printed circuit board (PCB) 232 mounted to the second cover 230, and may be connected to the PCB 232 by a flexible printed circuit board (FPCB).

A module mounting unit 231 for detachably mounting the function-extending module 240 is formed at the second cover 230. The module mounting unit 231 is formed at a side facing the terminal body 110 in a closed configuration.

A receiver hole 212 may be formed at one side of the module mounting unit 231. In a closed configuration, sound is output from the audio output unit 114 of the terminal body 110 through the receiver hole 212. A camera hole 213 through which the first video input unit 115 of the terminal body 110 is exposed may be formed at one side of the receiver hole 212.

A supplementary display 214 may be additionally provided on an outer surface of the second cover 230 (see FIG. 1). The supplementary display 214 may display simple information such as a transmitted/received status of an electric wave, a battery charged status, and a current time.

The function-extending module 240 provides one or more functions relating to the terminal body 110. The functions may include functions relating to input/output with respect to the terminal body 110, functions to extend an information processing function of the terminal body 110, functions to extend a wireless transmission/reception function of the terminal body 110, and so forth.

The function-extending module 240 may be implemented as a qwerty-type key pad, a key pad for games, or a key pad for music reproduction. Also, the function-extending module 240 may be implemented as a speaker module, a display module, a supplementary information processing device, a supplementary antenna, or a supplementary battery.

FIG. 5 is an exemplary view showing that the function-extending module is implemented as a qwerty-type key pad.

Manipulating units for receiving information by a user's manipulation are installed at the function-extending module 240. A user input unit is provided at the module mounting unit 231 for receiving user input information as the manipulating units are handled by a user.

The manipulating units may be implemented as a plurality of key buttons 242 arranged on a case 241 of the function-extending module 240. The key buttons 242 are installed on the case 241 so as to be manipulated in a pressing manner. The key buttons 242 may have an arrangement structure similar to that of a keyboard for a computer.

The PCB 232 mounted with electronic components relating to functions of the function-extending module 240 is mounted to the module mounting unit 231. The user input unit may be implemented as dome switches 233 arranged on the PCB 232. The key buttons 242 are positioned in correspondence to the dome switches 233.

In the present invention, the user input unit is implemented as the key buttons 242. However, if the manipulating units are implemented as touch keys, the user input unit may be implemented as touch sensors that sense whether the touch keys have been touched or not. In this case, the touch sensors may be disposed on the PCB 232.

A module interface 236 for connection between the PCB 232 and the function-extending module 240 may be provided at the PCB 232. The function-extending module 240 may receive power from the PCB 232, or may transmit/receive data to/from the PCB 232 through the module interface 236. To this end, a connection terminal connected to the module interface 236 may be disposed at a rear surface of the case 241.

A detachable fixing unit for fixing the function-extending module 240 onto the module mounting unit 231 may be provided at the case 241 of the function-extending module 240, and the module mounting unit 231. The detachable fixing unit may include holes 243 and 234 respectively formed at the case 241 and the module mounting unit 231; and screws 235 coupled to the holes 234 and 243 for fixing the function-extending module 240 to the module mounting unit 231. The detachable fixing unit may be implemented not only as the holes and the screws, but also as any pair of components that can be engaged to each other, such as locking grooves and locking hooks. For example, the detachable fixing unit may be configured as a snap-fit retainer the passes through hole 243 and securely engages hole 234 for fixing the function-extending module 240 to the module mounting unit 231.

A cover member that covers the screw hole 243 may be mounted to an upper surface of the screw hole 243 formed at the case 241. The cover member may be formed to have a loop shape, and prevents the screw 235 from being exposed by covering the screw hole 243.

Figure 7A:
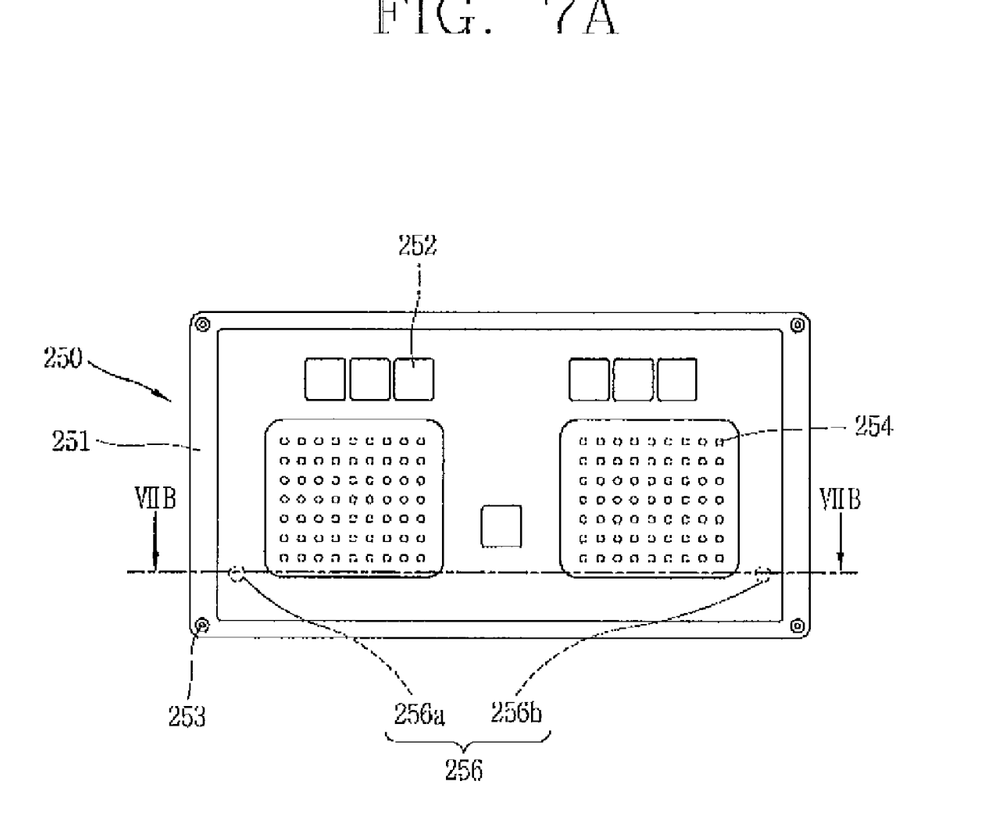
FIG. 7A is a plan view showing a function-extending module according to a second embodiment of the present invention.
Figure 7B:
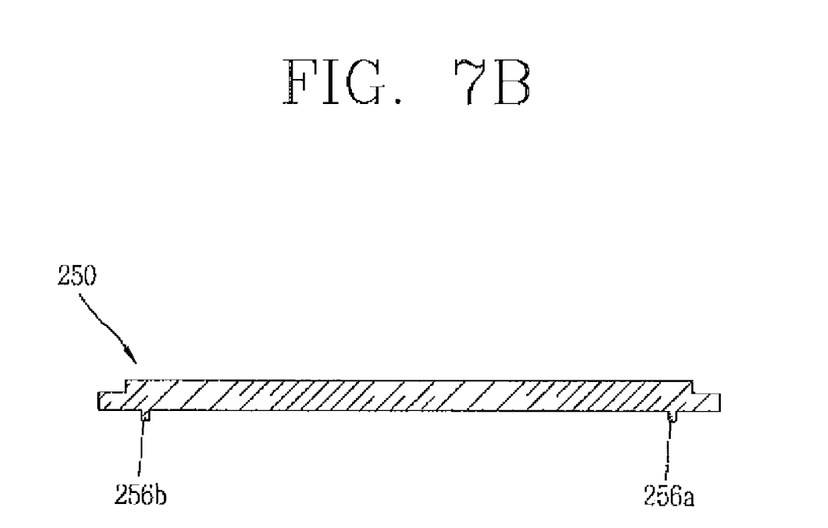
FIG. 7B is a sectional view showing the function-extending module taken along line 'VIIB-VIIB' in FIG. 7A.

FIG. 7A is a plan view showing a function-extending module according to a second embodiment of the present invention, and FIG. 7B is a sectional view showing the function-extending module taken along line 'VIIB-VIIB' in FIG. 7A.

A plurality of different function-extending modules 240 may be provided so as to have different functions from each other. The respective function-extending modules 240 may be mounted on the module mounting unit 231 in a replaceable manner.

The function-extending module may be implemented as a 'first function-extending module' and a 'second function-extending module'. One non-limiting example of the first function-extending module is a qwerty-type key pad as shown in FIG. 5, and one non-limiting example of the second function-extending module is a speaker module as shown in FIG. 7A. However, the first function-extending module and the second function-extending module are not limited to these two examples. One or more speakers 254 may be mounted to a case 251 of the second function-extending module 250. In order to complement the audio output unit 114 of the terminal body 110, the speaker 254 is configured to output a sound level higher than that of the audio output unit 114. Key buttons 252 for controlling a sound level and a tone output from the speaker 254 are provided at the case 251.

The key buttons 252 of the second function-extending module 250 may be formed only at some regions of the case 251 differently from the first function-extending module 240. The key buttons 252 of the second function-extending module 250 are also arranged in correspondence to regions where the dome switches 233 are positioned.

Sensing protrusions 256 for allowing the body 210 to sense whether the second function-extending module 240 has been mounted, may be formed on a rear surface of the case 251. The sensing protrusions 256 are formed to push one or more of the dome switches 233 arranged on the PCB 232.

The sensing protrusions 256 include first and second sensing protrusions 256a and 256b that push first and second switches 233a and 233b of the plurality of dome switches 233.

When either the first function-extending module 240 or the second function-extending module 250 is mounted to the body 210, the body 210 may sense, by the sensing protrusions 256, which of the first and second function-extending modules 240 and 250 has been mounted.

For example, when the first function-extending module 240 is not provided with sensing protrusions, whereas the second function-extending module 250 is provided with the first and second sensing protrusions 256a and 256b, the body 210 can recognize which of the first and second function-extending modules 240 and 250 has been mounted. The body 210 is set to receive user input information by the first function-extending module 240. The body 210 is also set to recognize that the second function-extending module 250 has been mounted, in the case that both the first switch 233a and the second switch 233b are pushed.

When the second function-extending module 250 is mounted to the body 210 under a state that the first function-extending module 240 is detached from the body 210, the first and second switches 233a and 233b are pushed by the first and second sensing protrusions 256a and 256b. Accordingly, the body 210 recognizes that the second function-extending module 250 has been mounted thereto. That is, the body 210 can recognize mounting of the second function-extending module 250 by distinguishing from mounting of the first function-extending module 240.

Based on a result of the recognition, the dome switches 233 are selectively activated according to the position of the key buttons 252. That is, the dome switches 233 corresponding to regions where the key buttons 252 are positioned are activated, whereas the dome switches 233 corresponding to regions where the key buttons 252 are not positioned are non-activated. Therefore, even if the dome switches 233 corresponding to regions other than the key buttons 252 are pushed, a user input information is not input to the PCB 232.

Figure 8A:
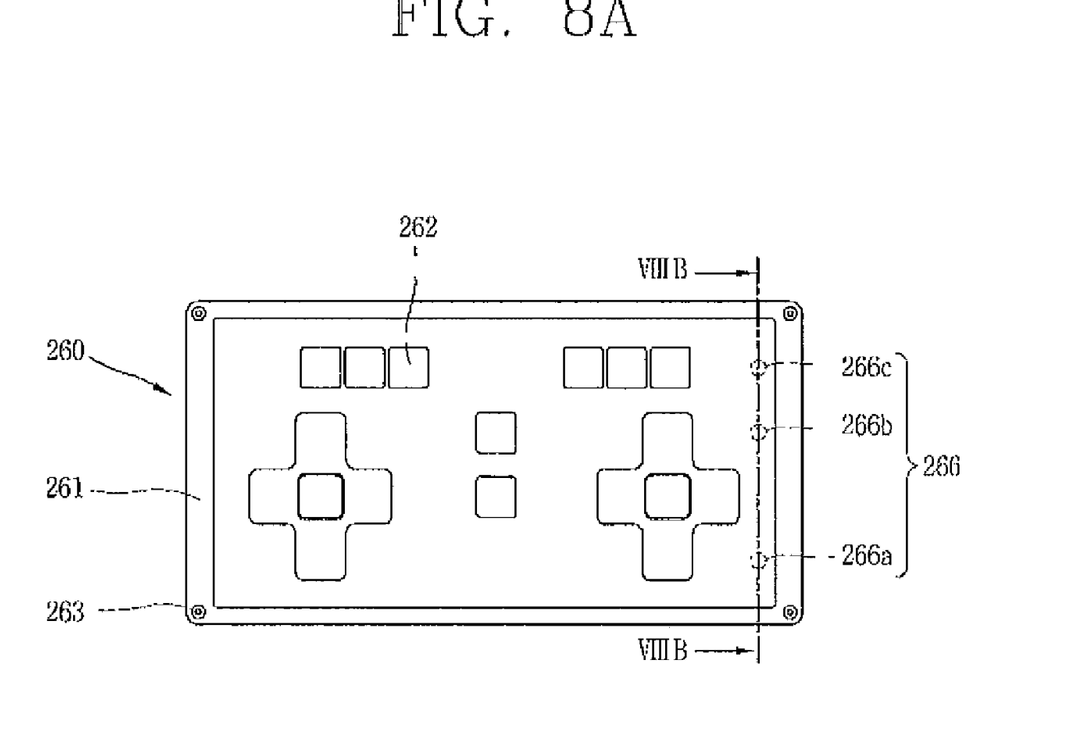
FIG. 8A is a plan view showing a function-extending module according to a third embodiment of the present invention.
Figure 8B:
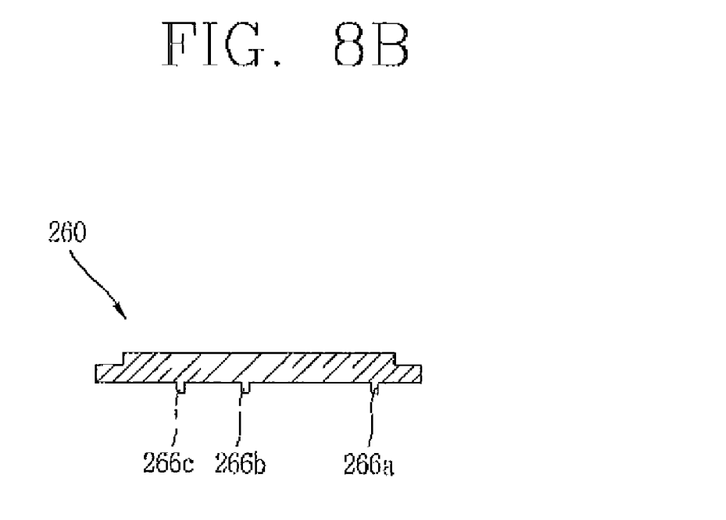
FIG. 8B is a sectional view showing the function-extending module taken along line 'VIIIB-VIIIB' in FIG. 8A.

FIG. 8A is a plan view showing a function-extending module according to a third embodiment of the present invention, and FIG. 88 is a sectional view showing the function-extending module taken along line 'VIIIB-VIIIB' in FIG. 8A.

The function-extending module 260 of the third embodiment is implemented as key pads for games. The function-extending module 260 may be implemented as a 'third function-extending module'. One non-limiting example of the third function-extending module is as the key pads for games. However, the third function-extending module is not limited to this one example.

A plurality of key buttons 262 are arranged at a case of the third function-extending module 260 so as to be controlled in a pressing manner. The key buttons 262 may be arranged so that a user can easily manipulate games through the key buttons 262.

The key buttons 262 may be arranged at positions equal to or different from those of the first and second function-extending modules 240 and 250. The key buttons 262 are arranged at positions corresponding to one or more of the dome switches 233.

Sensing protrusions 266 may be formed on a rear surface of a case 261 of the third function-extending module 260. The sensing protrusions 266 include third to fifth sensing protrusions 266a, 266b and 266c that push second to fourth switches 233b, 233c, and 233d of the dome switches 233.

Once the second to fourth switches 233b, 233c and 233d are pushed together, the body 210 recognizes that the third function-extending module 260 has been mounted thereto. When the third function-extending module 260 is mounted to the body 210, the second to fourth switches 233*b*, 233*c* and 233*d* are pushed by the third to fifth sensing protrusions 266*a*, 266*b* and 266*c*. Under this state, the body 210 recognizes that the third function-extending module 260 has been mounted thereto. That is, the body 210 can recognize mounting of the third function-extending module 260 by distinguishing from the respective mounting of the first and second function-extending modules 240 and 250.

The dome switches 233 corresponding to regions where the key buttons 262 are positioned are activated, whereas the dome switches 233 corresponding to regions where the key buttons 262 are not positioned are non-activated.

The sensing protrusions may be formed at different positions or in different numbers according to the function-extending modules 240, 250 and 260. Accordingly, the body 210 may distinguish the respective mounting of the first to third function-extending modules 240, 250 and 260 from each other. That is, the body 210 may recognize which of the first to third function-extending modules 240, 250 and 260 has been mounted.

Based on a result of the recognition, the body 210 may selectively activate the dome switches 233 corresponding to regions where the key buttons 242, 252, and 262 are positioned. When one of the function-extending modules 240, 250 and 260 is mounted to the body 210, the body 210 may operate functions of the mounted function-extending module. This will be explained in more detail with reference to FIGS. 9 to 11.

Figure 9:
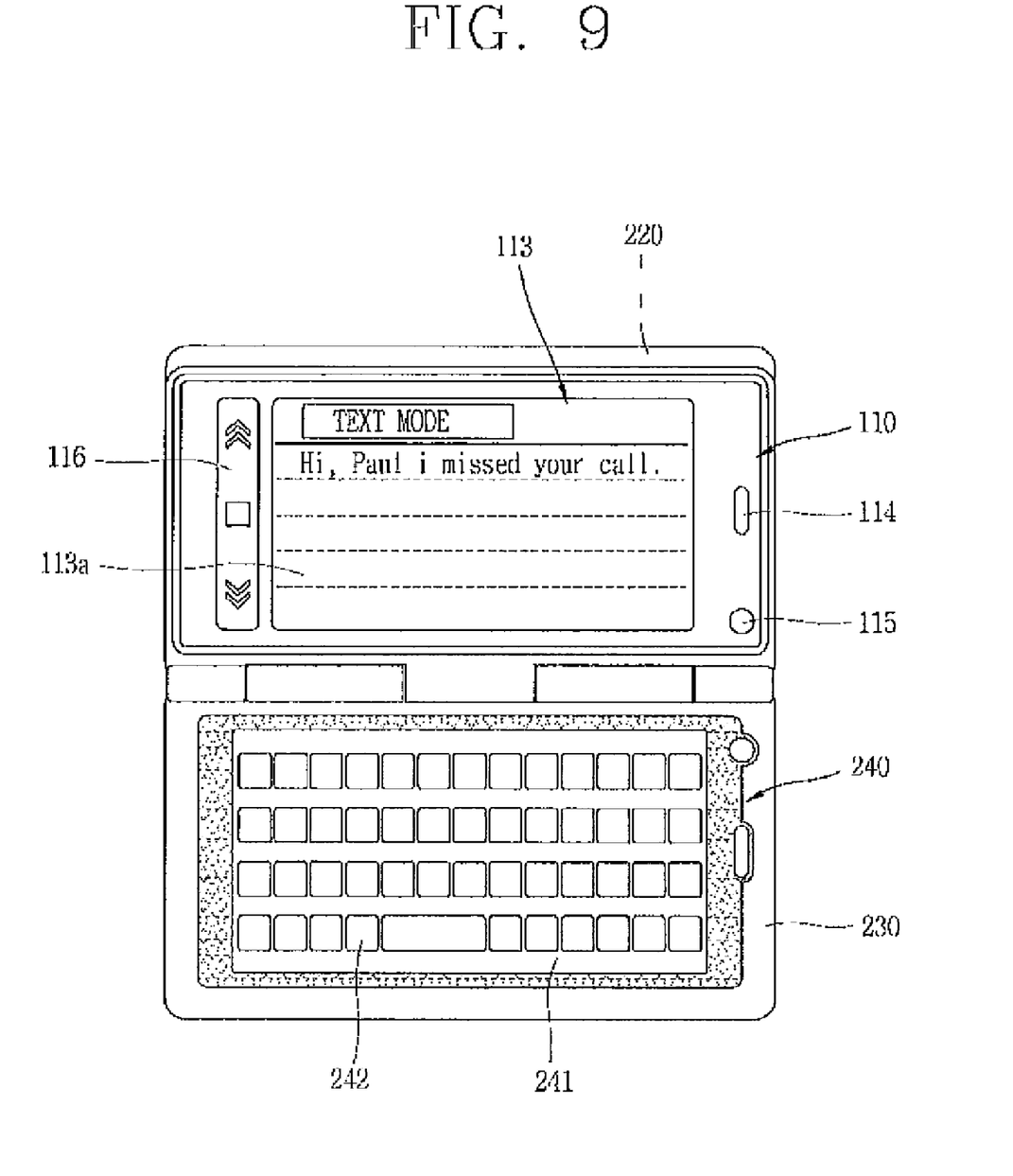
FIGS. 9 to 11 are plan views showing portable terminals to which the first to third function-extending modules are mounted, respectively.
Figure 10:
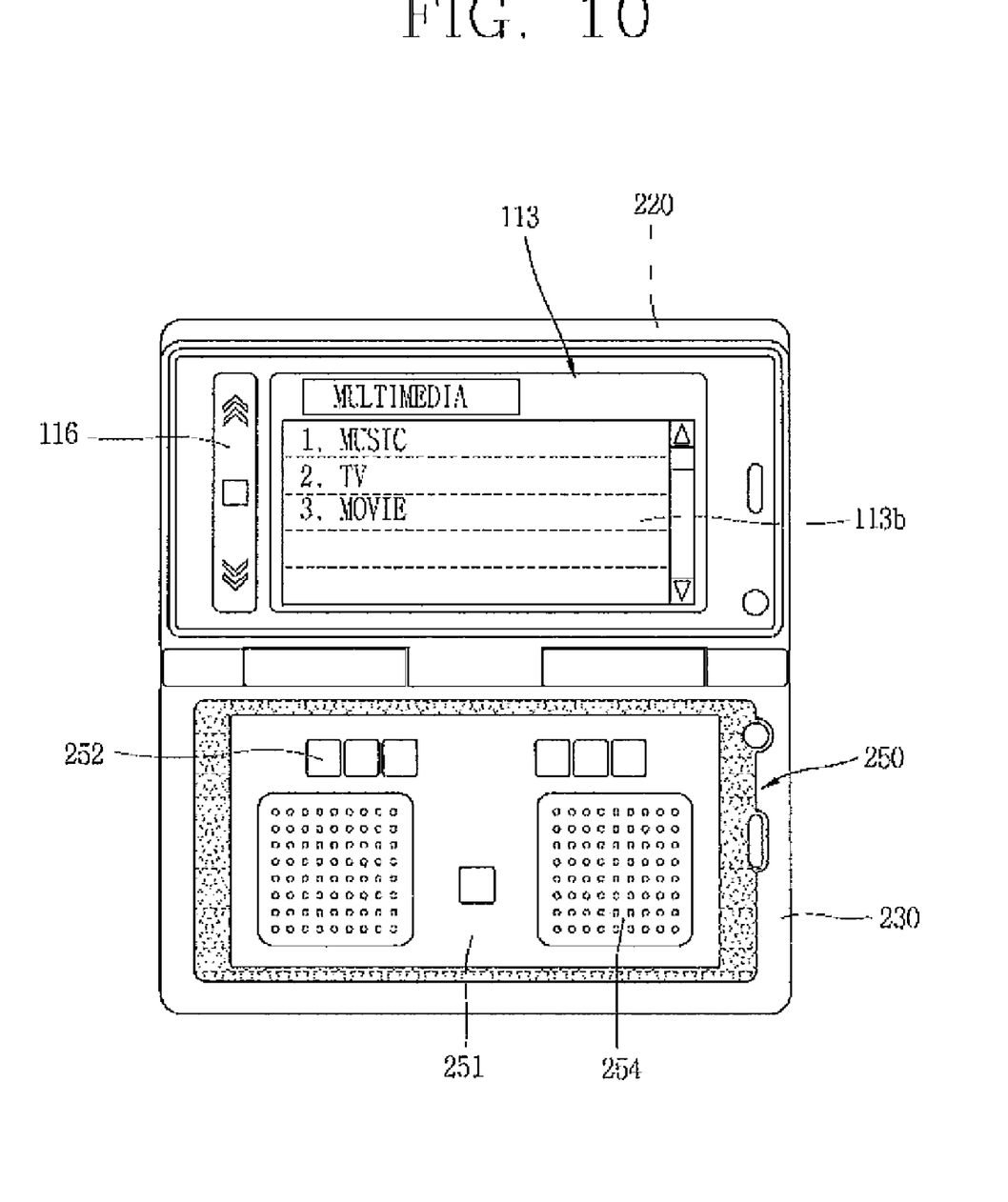
Figure 11:
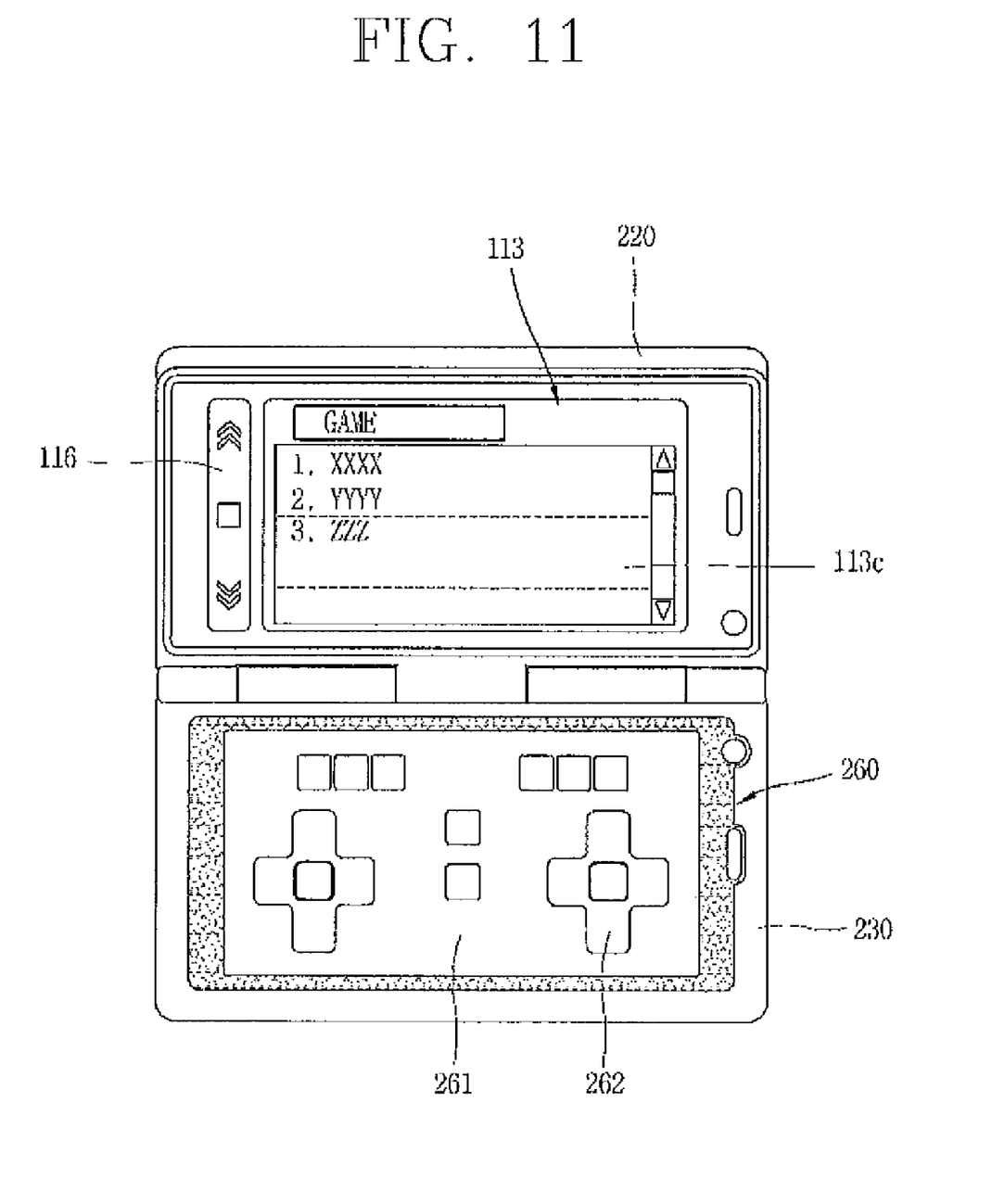

FIGS. 9 to 11 are plan views showing portable terminals to which the first to third function-extending modules are mounted, respectively, in an open configuration.

FIG. 9 shows a state that the first function-extending module 240 has been mounted to the body 210.

Once the first function-extending module 240 is mounted to the body 210, the terminal body 110 may operate functions relating to the first function-extending module 240, i.e., functions relating to input of text messages, numbers, symbols, and so forth.

FIG. 9 shows that a text mode is being executed, in which a text message display window 113*a* is displayed on the display 113 of the terminal body 110. Once the key buttons 242 are pressed by a user, text messages, symbols, numbers, and so forth corresponding to the pressed key buttons 242 are displayed on the text message display window 113*a*.

FIGS. 10 and 11 show that the second and third function-extending modules 250 and 260 are mounted to the body 210, respectively.

Referring to FIG. 10, once the second function-extending module 250 is mounted to the body 210, the terminal body 110 can operate functions relating to the second function-extending module 250, i.e., functions relating to output of sound. For instance, a menu 113*b* relating to output of sound may be output to the display 113 in the form of lists, icons, and so forth. When the display 113 is implemented as a touch screen, a user may operate corresponding functions by touching desired items or icons.

Referring to FIG. 11, once the third function-extending module 260 is mounted to the body 210, the terminal body 110 can operate functions relating to execution of games. FIG. 11 shows that a list 113*c* of games stored in the terminal body 110 is output to the display 113. A user can execute games to be played by touching one of items on the list 113*c*, or by manipulating the key buttons 262.

Figure 12:
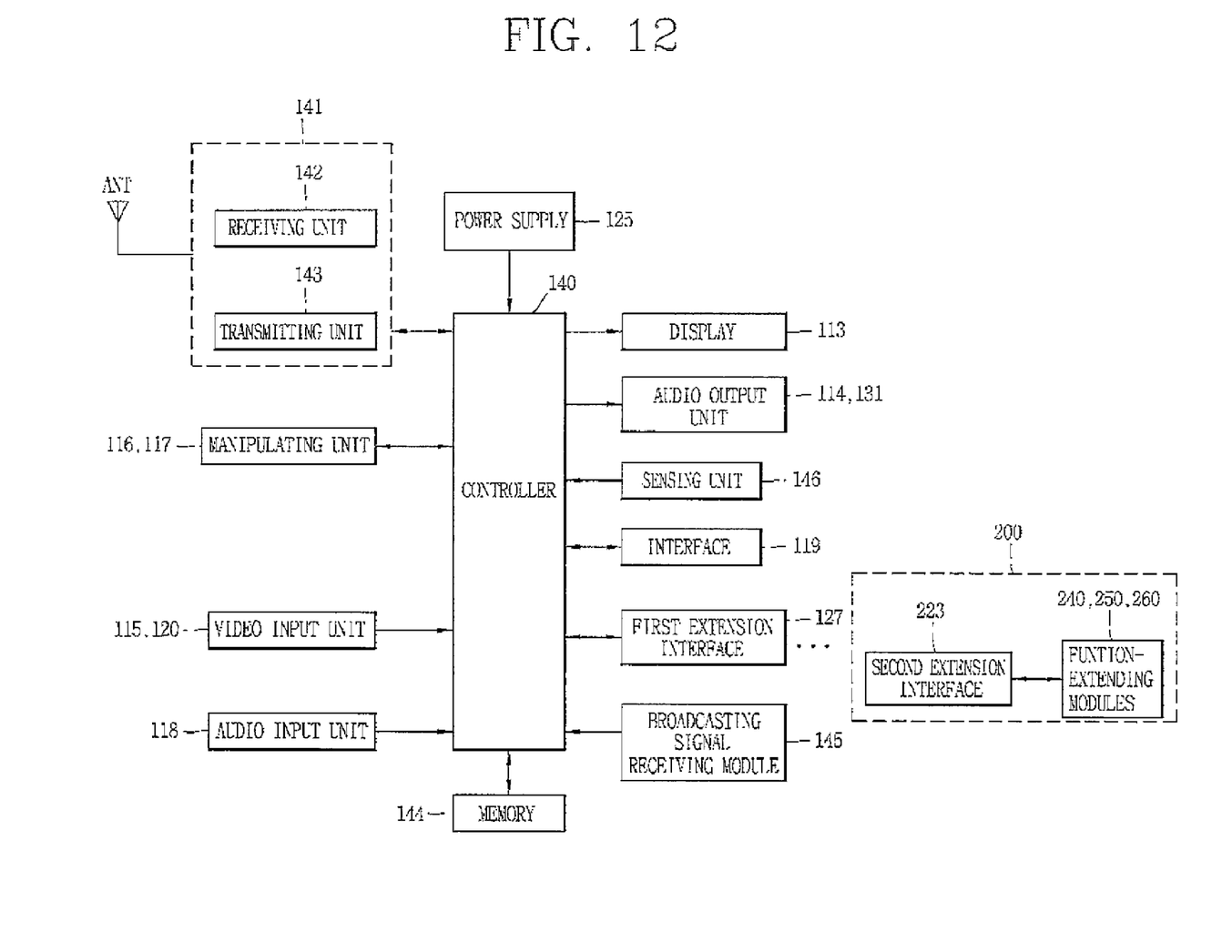
FIG. 12 is a block diagram showing the portable terminal according to the present invention.

FIG. 12 is a block diagram showing the portable terminal according to the present invention.

Referring to FIG. 12, the portable terminal according to the present invention comprises a wireless communication module 141, manipulating units 116 and 117, video input units 115 and 120, an audio input unit 118, a display 113, audio output units 114 and 131, a sensing unit 146, an interface 119, a first extension interface 127, a broadcasting signal receiving module 145, a memory 144, a power supply 125, a controller 140, and a function-extending assembly 200.

The controller 140 controls an entire operation of the portable terminal. For instance, the controller 140 performs controls and processes relating to voice communication, data communication, video communication, and so forth.

The controller 140 controls the function-extending assembly 200 as well as the general functions.

The controller 140 provides data to the function-extending assembly 200, or receives data from the function-extending module to apply the data to relevant components.

The wireless communication module 141 transmits/receives wireless signals to/from a base station through an antenna. For instance, the wireless communication module 141 transmits/receives voice data, text data, image data, and control data under control of the controller 140. The wireless communication module 141 includes a transmitting unit 142 for transmitting signals after a modulation process, and a receiving unit 143 for demodulating received signals.

The manipulating units 116 and 117 have a configuration shown in FIG. 1, and provide, to the controller 140, key input data input by a user so as to control the operation of the portable terminal. The manipulating units 116 and 117 are composed of dome switches, touch pads (static pressure/capacitance), jog wheels, jog switches, and the like.

Video input units 115 and 120 process image frames such as still images or moving images captured by an image sensor in a video-call mode or a capturing mode. Then, the processed image frames are converted to image data that can be displayed on the display 113, thereby being output to the display 113.

Image frames processed by the video input units 115 and 120 are stored in the memory 144 under control of the controller 140, or are transmitted outside through the wireless communication module 141.

The audio input unit 118 receives an external audio signal through a microphone in a call mode, or a recording mode, or a voice recognition mode, and so forth, and then processes the received signal into electric voice data. In the case of a call mode, the processed voice data is converted into data that can be transmitted to the base station through the wireless communication module 141, and then is output to the wireless communication module. In the case of a recording mode, the processed voice data is output so as to be stored in the memory 144.

The audio input unit 118 may include assorted noise removing algorithms to remove noise generated in the course of receiving the external audio signal.

The display 113 may output information processed in the portable terminal. For example, when the portable terminal is operating in a phone call mode, the display 113 will provide a User Interface (UI) or a Graphic User Interface (GUI) which includes information associated with the call. As another example, if the portable terminal is in a video call mode or a capturing mode, the display 111 may additionally or alternatively display captured images, or UI or GUI. In the case that the display 113 includes a touch screen, the display 113 may be used as an input device as well as an output device.

In a call signal reception mode, a communication mode or a recording mode, a voice recognition mode, a broadcasting signal reception mode, and so forth, the audio output units 114 and 131 convert audio data received from the wireless communication module 141, or audio data stored in the memory 144, under control of the controller 140. Then, the audio output units 114 and 131 output the converted data to the outside.

The audio output units 114 and 131 output audio signals relating to functions performed in the portable terminal, such as sound indicating a call signal reception, or sound indicating a message reception.

The sensing unit 146 senses a current status of the portable terminal such as an open/close status of the portable terminal, a position of the portable terminal, or whether a user has contacted the portable terminal, thereby generating sensing signals to control the operation of the portable terminal. For instance, when the portable terminal is implemented as a slide phone, the sensing unit 146 senses whether the slide phone has been opened or not, and outputs a result of the sensing thereby to control the operation of the portable terminal. Furthermore, the sensing unit 146 performs sensing functions relating to whether power has been supplied from the power supply 125, or whether the interface 126 has been coupled to an external device, and so forth.

The interface 119 interfaces a wired/wireless headset, an external charger, a wired/wireless data port, a card socket (e.g., memory card, SIM/UIM card), and the like, with any types of external devices connected to the portable terminal. The interface 119 transmits data or power received from external devices to each component in the portable terminal, or transmits data in the portable terminal to the external devices.

The memory 144 may store programs to be processed and controlled by the controller 140, or may temporarily store input/output data (e.g., phonebook, messages, still images, moving images, and the like).

The memory 144 may store programs to control the operation of the portable terminal according to the present invention.

The memory 144 may be implemented using any type of suitable storage medium including a flash memory type, a hard disk type, a multimedia card micro type, a memory card type (e.g., SD or DX memory), Random Access Memory (RAM), Read-Only Memory (ROM), and the like.

The broadcasting signal receiving module 145 receives broadcasting signals transmitted through satellite or terrestrial waves, and then converts the broadcast signals to broadcasting data that can be output to the audio output units 114 and 131, and to the display 113, thereby outputting the broadcasting data to the controller 140. The broadcasting signal receiving module 145 receives broadcasting-related additional data (e.g., Electric Program Guide: EPG, channel list, and the like). Broadcasting data and additional data converted by the broadcasting signal receiving module 145 may be stored in the memory 144.

The power supply 125 receives internal or external power, and supplies the power to each component of the portable terminal under control of the controller 140. The power supply may be also configured so as to supply power to the function-extending assembly 200.

The first and second extension interfaces 127 and 223 serve as passages that connect the function-extending module 240 of the function-extending assembly 200 with the terminal body 110. The function-extending module 240 may be configured so as to be controlled by the controller 140.

For instance, a user input information input through the first function-extending module 240 is transmitted to the controller 140 through the first and second extension interfaces 127 and 223. Then, the controller 140 applies a corresponding signal to the display 113 so that user input information can be output to the display 113.

In the aforementioned embodiments, the function-extending assembly 200 is controlled by the controller 140. However, the function-extending assembly 200 may be further provided with an additional controller that independently controls the function-extending module 240.

The portable terminal according to the present invention has several effects.

Firstly, the plurality of function-extending modules having various functions are applied to the function-extending assembly in a replaceable manner. Accordingly, various extended functions can be provided to the portable terminal serving as a single device.

Secondly, the body can recognize which of the plurality of function-extending modules has been mounted thereto, through the sensing protrusions provided thereat.

Thirdly, since the user input unit is selectively activated based on a result of the sensing, user input information is prevented from being undesirably input.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
    a terminal body having a wireless communication function; and
    a reconfigurable function-extending assembly comprising:
        a body to which the terminal body is mounted;
        a module mounting unit located at the body; and
        a first function-extending module detachably mounted to the module mounting unit, the reconfigurable function-extending assembly being reconfigurable by replacing the first function-extending module with a second function-extending module.

2. The portable terminal of claim 1, wherein the body comprises:
    a first cover having a terminal body mounting unit to mount the terminal body; and
    a second cover connected to the first cover, the second cover being foldable with respect to the first cover, the second cover being provided with the module mounting unit.

3. The portable terminal of claim 2, further comprising a hinge connection unit rotatably connecting the first cover to the second cover.

4. The portable terminal of claim 2, further comprising a leather protection layer located on outer surfaces of the first and second covers.

5. The portable terminal of claim 1, wherein the body further comprises a module interface configured to connect the terminal body and the first function-extending module with each other.

6. The portable terminal of claim 1, wherein the first function-extending module comprises at least one of a qwerty-type key pad, a key pad for games, a key pad for music reproduction, a speaker module, and a display module.

7. The portable terminal of claim 1, further comprising:
a circuitry supporting substrate provided with electronic components relating to the function-extending modules, the circuitry supporting substrate being mounted to the module mounting unit; and
a user input unit provided on the circuitry supporting substrate.

8. The portable terminal of claim 7, wherein the function-extending modules includes one or more buttons configured to receive input in a pressing manner, and
wherein the circuitry supporting substrate includes a plurality of dome switches actuatable by pressing the one or more buttons.

9. The portable terminal of claim 8, further comprising sensing protrusions provided on the function-extending modules for pushing one or more of the dome switches and providing an indication of whether the first function-extending module has been mounted or not.

10. The portable terminal of claim 9, wherein the sensing protrusions are formed at different positions, or in different numbers, according to each of the function-extending modules.

11. The portable terminal of claim 7, wherein the function-extending modules include touch keys configured to receive input in a touch manner, and
wherein the user input unit comprises touch sensors installed on the circuitry supporting substrate.

12. The portable terminal of claim 1, wherein the user input unit is arranged at a plurality of positions so that the function-extending modules can be applied thereto.

13. The portable terminal of claim 12, wherein the terminal body is configured so that the first function-extending module can be activated when the function-extending module is connected to the terminal body.

14. A reconfigurable function-extending assembly for a mobile terminal, comprising:
a body to which a terminal body is detachably mountable;
a module mounting unit located at the body; and
a first function-extending module detachably mounted to the module mounting unit,
whereby the reconfigurable function-extending assembly is reconfigurable by replacing the first function-extending module with a second function-extending module.

15. The reconfigurable function-extending assembly of claim 14, further comprising:
a circuitry supporting substrate provided with electronic components relating to the function-extending modules, the circuitry supporting substrate being mounted to the module mounting unit.

16. The reconfigurable function-extending assembly of claim 15, wherein the function-extending modules include one or more buttons configured to receive input in a pressing manner, and
wherein the circuitry supporting substrate includes a plurality of dome switches actuatable by pressing the one or more buttons.

17. The reconfigurable function-extending assembly of claim 16, further comprising sensing protrusions provided on the function-extending modules for pushing one or more of the dome switches and providing an indication of whether a function-extending module has been mounted or not.

18. The reconfigurable function-extending assembly of claim 17, wherein the sensing protrusions are formed at different positions, or in different numbers, according to each of the function-extending modules.

19. The reconfigurable function-extending assembly of claim 14, wherein the function-extending modules include touch keys configured to receive input in a touch manner, and
wherein touch sensors are provided on the circuitry supporting substrate.

20. The reconfigurable function-extending assembly of claim 14, wherein the body comprises:
a first cover having a terminal body mounting unit configured to mount a terminal body thereto; and
a second cover connected to the first cover, the second cover being foldable with respect to the first cover, the second cover being provided with the module mounting unit.

* * * * *